Nov. 1, 1966  C. D. WILSON  3,282,459
PRESSURE VESSEL HAVING CONCENTRIC CASINGS
Filed Oct. 2, 1964
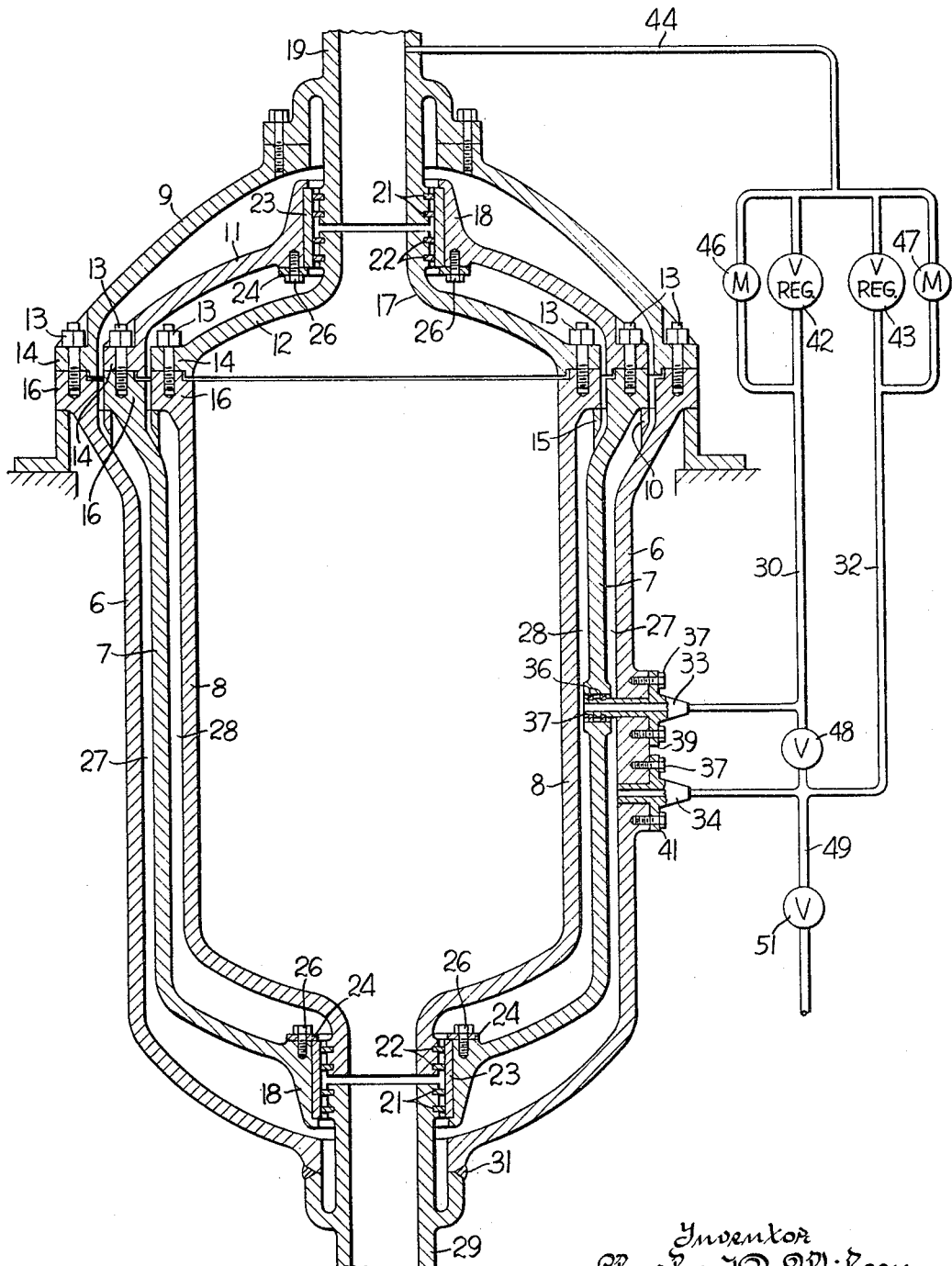
Inventor
Charles D. Wilson
By John P. Hines
Attorney : 3,282,459
Patented Nov. 1, 1966

3,282,459
PRESSURE VESSEL HAVING CONCENTRIC CASINGS
Charles D. Wilson, West Allis, Wis., assignor to Allis-Chalmers Manufacturing Company, Milwaukee, Wis.
Filed Oct. 2, 1964, Ser. No. 401,076
2 Claims. (Cl. 220—3)

This invention pertains to high pressure vessels.

Some high pressure vessels now in use by processing and refinery industries are 90 inches in diameter and about 70 feet in overall length. These vessels may operate at pressures of 2600 p.s.i. and at temperatures of 475° F. Many of these vessels are designed as a single wall casing with either a bolted flange or pressure seal flange for the cover joint.

Future requirements for the processing and refinery industries call for larger diameter and higher temperature and pressure operation. A further increase in either diameter pressure or temperature will in many instances result in increasing the single casing wall thickness to a value that is not practical. Thick, single walled pressure vessels are difficult to heat safely because transient temperature gradients across the wall can cause excessive thermal stress in the inner and outer wall surfaces. To safely control the heating and cooling of thick walled pressure vessels, the rate of temperature change must be slowed down sufficiently to avoid excessive transient temperature gradients. In many cases, this reduced rate of heating and cooling will be inconvenient, will slow down the process in which the vessel is used and will require careful control and supervision of the operation. Careless control of the heating and cooling of thick walled pressure vessels with resulting excessive temperature gradients across the walls will shorten the useful life of the pressure vessel and can result in eventual failure of the vessel after repeated cyclic strain.

It is applicant's intention to devise a high pressure vessel which can withstand the high pressures and temperatures which are contemplated and which does not require the extremely thick casing walls. It is therefore the general object of this invention to provide a high pressure vessel which overcomes the shortcomings of previously known single, thick walled vessels.

A more specific object of the subject invention is to provide a high pressure vessel with concentric casings having a pressure chamber between the casings so as to decrease the pressure differential between the inner and outer wall surfaces of each casing.

A further object of the subject invention is to provide a high pressure vessel of the hereinbefore described type wherein high temperature pressurized fluid is permitted to flow into the chamber between the casings to provide regulated heating of the casing walls.

These and other objects of the subject invention will become more fully apparent as the following description is read in light of the attached drawing wherein:

The drawing is a vertical section of a pressure vessel constructed in accordance with this invention.

Referring to the attached drawing, the pressure vessel of the subject invention may be constructed of any number of individual casings and is herein shown for purposes of illustration as comprising three separate casings 6, 7 and 8, each adapted to receive a cover 9, 11 and 12 respectively. The covers 9, 11 and 12 may be attached to the respective casings by means of bolts 13 passing through an annular flange 14 provided at the periphery of each cover and threaded into openings provided in an annular shoulder 16 at the end of each casing. Casings 7 and 8 are supported, respectively, on annular flanges 10 and 15 provided on the inner surface of 6 and 7 respectively. If necessary, a gasket may be provided between the mating surfaces of the casings and the casing covers.

The casing cover 12 may be provided with a reduced annular inlet neck 17. The casing cover 11 of the modification of the invention shown herein for purposes of illustration is provided with an annular flange 18 thereon spaced closely adjacent and about the neck 17 of the cover 12. An inlet pipe 19 may be connected in any conventional manner such as by bolting a flange to the outer cover 9 so as to provide a fluid tight seal therewith. The inner end of the pipe 19 terminates adjacent to the end of the neck 17 of the cover 12. The adjacent ends of the pipe and neck may be provided with pressure breakdown means herein shown as one or more annular seal rings 21 and 22 respectively. Furthermore, cylindrical seal ring 23 may be provided on the inner surface of the flange 18 of the casing cover 11. The seal ring 23 may be held in place by an end ring 24 connected to the inner end of flange 18 in any conventional manner such as by circumferentially spaced cap screws 26. The seal rings 21 and 22 and the seal ring 23 are preferably composed of an oxidation resistant material. The seal between these rings is effective to resist fluid flow therebetween, however, a seepage of fluid into chambers 27 and 28 defined by the casings 6, 7 and 7, 8 respectively is not objectionable as will be understood as the description of the invention is read.

Since the outlet end of the high pressure vessel is substantially identical to the inlet end previously described, similar character references have been used and a separate description is not deemed necessary. However, one distinction is apparent between the discharge pipe 29 and the casing 6. Instead of a bolted connection a welding joint 31 may conveniently be employed.

A regulating system is employed to maintain the pressure in the chamber 28, at a higher value than the pressure in the chamber 27. Two pipe fittings 33 and 34 are provided into the chambers 28 and 27 respectively. A slip joint to accomodate relative movement between the casing 7 and the casing 6 is provided into chamber 28. This may be effected by employing ring seals 36 about the inner end of pipe fitting 33. Bosses 39 and 41 may be provided on the casing 6 to receive complementary flanges herein shown as an integral part of fittings 33 and 34. Cap screws 37 may be provided to connect the respective fittings to casing 6. Chamber 28 is connected to a pressure regulator 42 by way of conduit 30. Chamber 27 is connected to another pressure regulator 43 by means of conduit 32. Both pressure regulators are connected by conduit 44 to the high pressure inlet pipe 19. Manual shutoff valves 46 and 47 may be connected in parallel with the regulator valves 42 and 43 respectively. Chamber 28 is also connected to chamber 27 through an additional pressure relief valve 48. Both chambers 27 and 28 are also connected to a low pressure area (not shown) by means of conduit 49. Pressure relief valve 51 is provided in conduit 49.

The operation of the system is as follows. From a cold start, high pressure high temperature fluid is admitted to casing 8 by inlet pipe 19. Conduit 44 at the same time exposes regulators 42 and 43 and manual valves 46 and 47 to the same pressure and temperature. At start up, manual valves 46 and 47 are opened causing relief valves 48 and 51 to be exposed to the full pressure of the system. These valves open permitting the fluid to circulate through the system until the outer walls of casings 7 and 8 have reached the desired temperature. The manual valves 48 and 51 are then closed and when the pressures in chambers 27 and 28 fall to the desired values the valves 48 and 51 close. This puts the system under the control of the regulator valves 42 and 43. Regulator 42 is controlled by the pressure in chamber 28 and is adjusted to maintain this pressure below the pressure within casing 8. Regulator 43 is controlled by the pressure in chamber 27 and is adjusted to maintain this pressure below the pressure in chamber 28.

Relief valve 48 is adjusted to open at a pressure slightly above the pressure desired in chamber 28. Should this pressure be exceeded, valve 48 opens and exposes chamber 27 to the pressure in chamber 28. When this pressure exceeds the pressure desired in chamber 27, valve 51 opens and discharges into a low pressure area. The valves 48 and 51 automatically close when the pressures in the chambers 27 and 28 have dropped to the desired values.

With this arrangement it can be seen that extremely high pressures and temperatures can be maintained within the casing 8 without resorting to extremely thick, solid walls. This is accomplished by utilizing the pressure of the fluid itself to control the amount of pressure differential between inner and outer surfaces of each casing. Furthermore, the fluid is bypassed to the outer walls of the two inner casings to maintain the same temperature on the inner and outer surfaces of each casing. In this manner a workable pressure and transient temperature gradient is maintained, thereby minimizing substantially the possibility of rupture of the vessel walls.

Although only one embodiment of the subject invention has been therein shown and described, other embodiments will be apparent to those skilled in the art at this description is read, and it is intended that all such embodiments as come within a reasonable interpretation of the appended claims be covered.

The embodiments of the invention in which an exclusive property or privilege is claimed are defined as follows:

1. A vessel for high pressure high temperature fluid comprising: an inner casing having an inlet opening; a fluid inlet pipe positioned in registery with said inlet opening and spaced from said inner casing; an intermediate casing encompassing said inner casing, said casings defining an inner chamber therebetween; an outer casing encompassing said intermediate casing, said outer casing and said intermediate casing defining an outer chamber therebetween; means providing a fluid tight seal between said pipe and said outer casing; pressure breakdown means positioned between said intermediate casing and said pipe and said inlet opening resisting fluid flow into both said chambers and permitting relative longitudinal movement therebetween; fluid conduit means connecting said inlet pipe in fluid communication with both said inner and outer chambers; a first regulator valve in said conduit means adapted to maintain the pressure in said inner chamber at a first predetermined pressure below the pressure in said inlet pipe; a second regulator valve in said conduit means adapted to maintain the pressure in said outer chamber at a second predetermined pressure below the pressure in said inner chamber; first discharge conduit means connecting said inner chamber in fluid communication with a low pressure area; first normally closed valve means in said first discharge conduit means adapted to open when the fluid pressure in said inner chamber exceeds said first predetermined pressure; second discharge conduit means connecting said outer chamber in fluid communication with a low pressure area; second normally closed valve means in said second discharge conduit means adapted to open when said fluid pressure in said outer chamber exceeds said second predetermined pressure; and outlet means in fluid communication with said inner casing.

2. The pressure vessel set forth in claim 1 and further comprising: a manual shutoff valve in parallel with said regulator valves and connecting said chamber in direct fluid communication with said inlet pipe.

References Cited by the Examiner

UNITED STATES PATENTS

| | | | |
|---|---|---|---|
| 339,885 | 4/1886 | Hill | 220—10 |
| 2,389,246 | 11/1945 | Davey | 220—10 |
| 3,044,654 | 7/1962 | Creighton | 220—3 |

THERON E. CONDON, *Primary Examiner.*

RAPHAEL H. SCHWARTZ, *Examiner.*